B. MAYER.
TRANSMISSION GEARING.
APPLICATION FILED NOV. 25, 1914.
1,147,528.
Patented July 20, 1915.
2 SHEETS—SHEET 2.
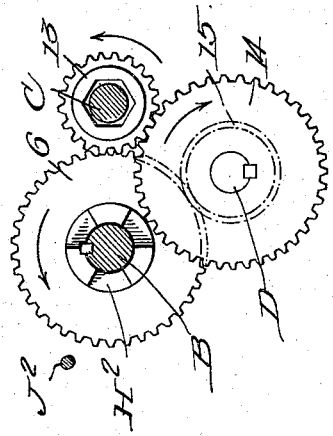
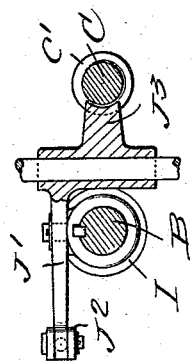
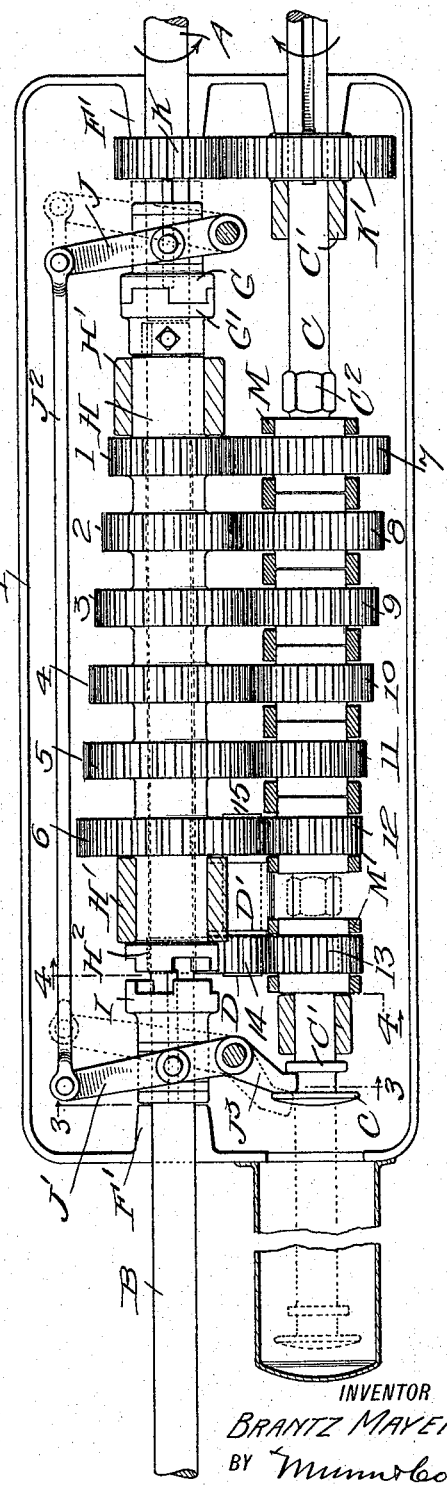
WITNESSES
INVENTOR
BRANTZ MAYER,
BY Munn & Co.
ATTORNEYS

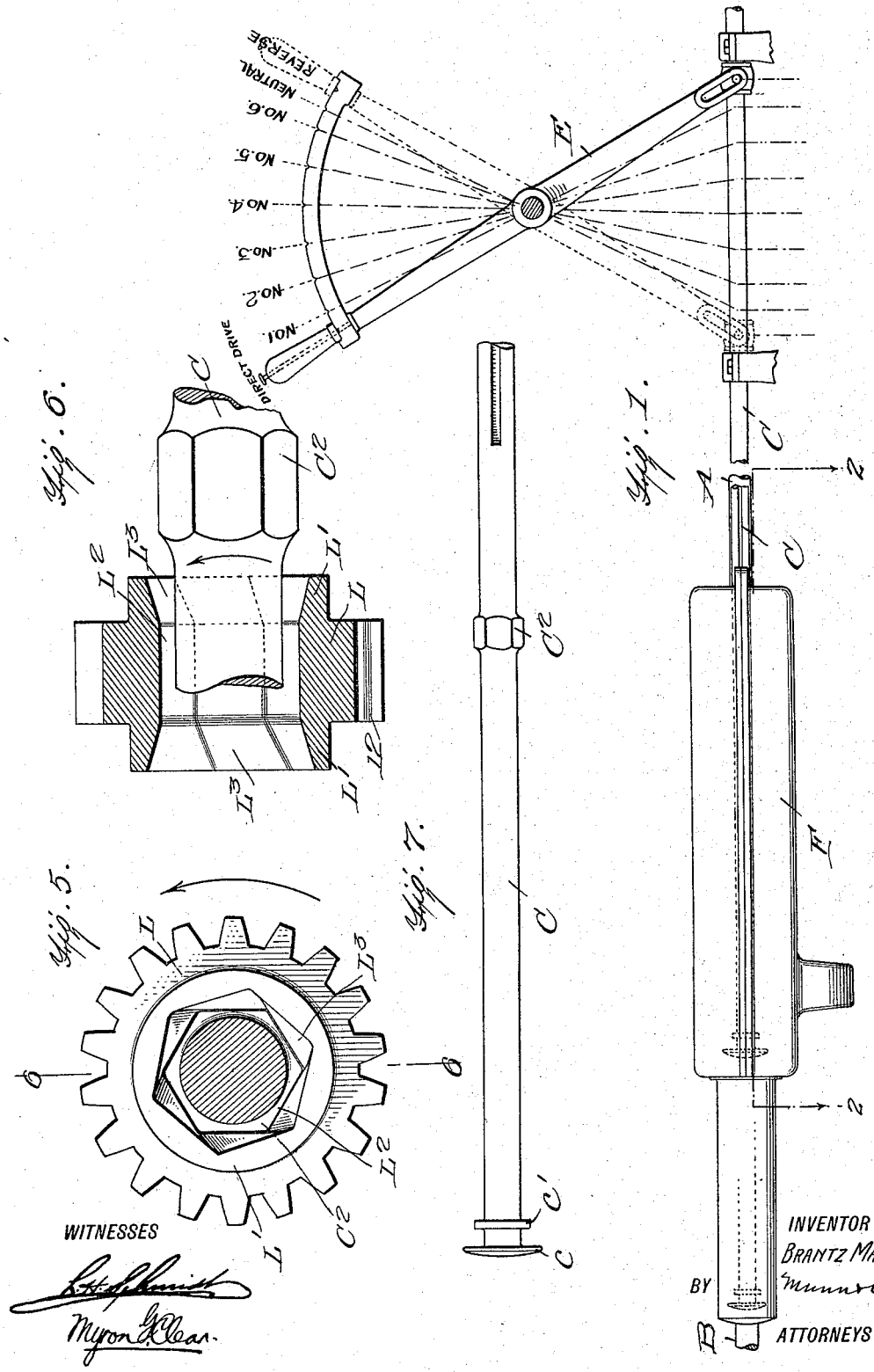

UNITED STATES PATENT OFFICE.

BRANTZ MAYER, OF THE UNITED STATES NAVY.

TRANSMISSION-GEARING.

1,147,528.  Specification of Letters Patent. Patented July 20, 1915.

Application filed November 25, 1914. Serial No. 873,878.

*To all whom it may concern:*

Be it known that I, BRANTZ MAYER, of the United States Navy, stationed on U. S. S. *Dixie*, (whose address is P. A. Paymaster BRANTZ MAYER, United States Navy, U. S. S. *Dixie*, care of postmaster, New York,) have invented an Improvement in Transmission-Gearing, of which the following is a specification.

My present invention relates to transmission gearing, and particularly to the transmission gears of automobiles and motor cars, my object being to provide certain new and useful improvements, including a gear train which is always in mesh, together with positive means movable through a portion of the gear train and adapted to connect the gears either progressively or selectively, and also including novel reversing and direct drive features.

In carrying out my improvements I preferably employ the construction, arrangement and combination of parts as shown in the accompanying drawings, which form a part of this specification, and in which—

Figure 1 is a side view illustrating the boxed transmission mechanism and its operative relation with the controlling lever. Fig. 2 is a plan view with the upper portion of the box removed, and partly in section, illustrating the complete gearing. Fig. 3 is a transverse section taken therethrough substantially on line 3—3 of Fig. 2. Fig. 4 is a similar view taken therethrough substantially on line 4—4 of Fig. 2. Fig. 5 is a sectional view through the countershaft illustrating one of its gears in side elevation. Fig. 6 is a vertical section taken substantially on line 6—6 of Fig. 5, and Fig. 7 is a side elevation of the counter-shaft.

Referring now to these figures, my improved transmission gearing includes a driving shaft A, a driven shaft B, and a pair of counter-shafts C and D, the former of which is longitudinally movable and controlled in such movement by a lever for instance of the type shown at E and in Fig. 1.

The gearing is mounted within a gear case F having alined bearings F' for the driving and driven shafts A and B, the ends of which are contiguous to one another adjacent one end of the gear case and are respectively provided with clutch members G and G'. The clutch member G' is secured to the driven shaft B while the clutch member G is splined on the driving shaft A for movement to engage the clutch member G', as shown in Fig. 2, and thus form a direct connection between the driving and driven
shafts.

The driven shaft B carries a series of gears 1, 2, 3, 4, 5 and 6, progressively increasing in diameter from the first to the last-mentioned, these several gears of the series being preferably formed integral with a sleeve H disposed on the shaft and having its ends supported in bearings H' within the gear case. At its end remote from the engaging clutch members G and G', the sleeve H is provided with a clutch member $H^2$ adapted to be engaged by a sliding clutch member I splined on the driven shaft B. The movable clutch members G and I are controlled by levers J and J', fulcrumed within the gear case and connected by a connecting rod $J^2$ so as to cause their simultaneous movement, this connection being such that only one of the said clutch members may be engaged at the same time. The driving shaft A is also provided with a gear K constantly in mesh with a gear K' splined on the counter-shaft C, which latter is longitudinally movable in bearings C' within the gear case and is provided with an intermediate polygonal enlargement $C^2$ constituting an integral and positive gear engaging or clutching member in a manner which will be hereinafter described.

The counter-shaft C extends through a series of independent gears 7, 8, 9, 10, 11 and 12, progressively decreasing in diameter from the first to the last-mentioned, and constantly in mesh with the series of gears 1, 2, 3, 4, 5 and 6, respectively, the several gears 7, 8, 9, 10, 11 and 12 each consisting of a body L having circular side flanges L', these side flanges of the several gears being mounted in bearings M within the gear case. Each of the gears of the series last-mentioned is also provided with a polygonal bore $L^2$ through its body L having polygonal tapered end portions $L^3$ through the flanges L', the faces of which tapered or outwardly flaring end portions of the bores are cut spirally as will be plainly seen by reference to Figs. 5 and 6. Thus the polygonal enlargement $C^2$ of the counter-shaft C, which is adapted to interfit the bores $L^2$ of the several gears of the series last-mentioned, is facilitated as to its passage into and from the bore of any or all of these gears by the particular construction of the tapered spirally cut faces of the bore ends L³.

Spaced from the gear 12 at one end of the gear series of the counter-shaft C is a single gear 13 mounted in bearings M' and similar in construction to the several gears of the series last-mentioned, this gear 13 as seen in Fig. 4 being in mesh with a gear 14 upon one end of the counter-shaft D, which latter is mounted in a bearing D' and is provided at its other end with a gear 15 in mesh with the gear 6 at the adjacent end of the series of gears on the driven shaft. Thus with the polygonal enlargement C² of the counter-shaft C in the space between gears 12 and 13, as shown in dotted lines in Fig. 2, and with the clutch members G and G' disengaged, the parts are in neutral position and when the said counter-shaft C is moved longitudinally toward the right in Fig. 2 from this position, to extend within and engage gear 12, rotation is transmitted through this gear and gear 6 to the driven shaft B with the clutch members I and H² engaged. This speed of movement of the driven shaft is increased as movement of the shaft C is continued toward the right in Fig. 2, due to the engagement of its polygonal enlargement C² with the several gears 11, 10, 9, 8 and 7, in connection with the latter of which the highest forward speed is attained except when driving shaft A is directly connected with driven shaft B by clutch members G and G'.

With the parts in the position shown in dotted lines in Fig. 2 and above referred to, movement of the counter-shaft C toward the left results in the engagement of its enlargement C² within the gear 13 which, with the clutch members I and H² in engaged position, results in the transmission of reverse rotation to the driven shaft B through the gears 14 and 15 of the counter-shaft D and gear 6 of the series of driven shaft gears. In all of these movements the movable clutch members G and I are automatically controlled by means of an extension J³ of the lever J' which is freely engageable in the annular space between shoulders $c$ and $c'$ at the inner end of the counter-shaft C. Thus when the counter-shaft C is entirely withdrawn from the series of counter-shaft gears before mentioned and as shown in full lines in Fig. 2, shoulder $c$ has engaged the lever extension J³ and moved the levers J and J' to disengage the clutch members I and H² and engage the clutch members G and G' whereby to effect a direct connection between the driving and driven shafts A and B as before described. As soon as counter-shaft C is moved toward the left from this position shown in full lines in Fig. 2, shoulder $c'$ forces the lever extension J³ to the left and out of the space between the shoulder, thus rocking the levers J and J' so as to disengage the clutch members G and G' and engage the clutch members I and H², and this position of the clutch members is maintained throughout the travel of the enlargement C² of counter-shaft C from the gear 7, constituting the highest forward geared speed, to and including the gear 13 constituting the reverse, and the neutral position as shown in dotted lines in Fig. 2.

Thus from the foregoing it will be seen that I provide a transmission gearing which is particularly adapted for use in connection with automobiles inasmuch as the several gears of the gear series are always in mesh and the single element movable to control the various forward speeds, including the direct drive, and also the neutral and reverse positions, may be readily operated from the driver's seat. Furthermore the particular construction of the several gears of the movable counter-shaft permits the operator to lead the polygonal enlargement C² easily into and through these gears when the counter-shaft is not turning. It is to be understood, however, that this counter-shaft engagement may be shifted from any gear to another of the counter-shaft train when the counter-shaft is turning. Furthermore, when driving shaft A is directly connected with driven shaft B, by clutch members G and G', all gears, with the exception of gears K and K', are stationary, thus avoiding unnecessary wear.

I claim:—

1. In a transmission gearing of the character described, the combination of a driving shaft, a driven shaft alined therewith, a series of gears loosely revolving in unison on said driven shaft, a pair of counter-shafts arranged parallel with and adjacent said driving and driven shafts and one of which counter-shafts is movable lengthwise and provided with a polygonal enlargement, a pair of gears on the outer countershaft, one of which is in mesh with one of the gears of the driven shaft, a single gear through which the movable counter-shaft extends arranged in mesh with the other gear of the other counter-shaft, a series of gears independently revoluble and through which the countershaft also passes, said last named series of gears being in mesh with the series of gears of the driven shaft, all of said gears through which the said counter-shaft extends having polygonal bores into and through which the said polygonal enlargement of the counter-shaft is adapted for movement, a clutch connecting the driven shaft and its gear series, a second clutch forming a direct connection between the driving and driven shafts, levers for engaging and disengaging said clutches, a rod connecting said levers whereby to disengage one clutch when the other is engaged, one of said levers having an extension, the movable counter-shaft having a pair of collars or shoulders for engaging and moving the lever extension in accordance with the direction of movement of the said shaft, a gear on the drive shaft, and a gear on the movable countershaft meshing therewith.

2. In a transmission gearing of the character described, the combination of a driving shaft, a gear thereon, a driven shaft alined therewith, a clutch forming a direct connection between the driving and driven shafts, a series of gears loosely revolving in unison on said driven shaft, a clutch for locking said series of gears with the driven shaft, a longitudinally movable counter-shaft arranged adjacent and parallel with the said driving and driven shafts, a gear mounted thereon and meshing with the gear on the driving shaft, clutch operating connections with which portions of the said counter-shaft are engageable to automatically control the positions of the said clutches by movement of the counter-shaft, said counter-shaft having an intermediate polygonal enlargement, and a series of gears through which the said counter-shaft extends, arranged in mesh with the series of gears of the driven shaft, each of said gears of the counter-shaft series of gears being independently revoluble and having a polygonal bore provided with flaring end portions, the faces of which are cut spirally to facilitate entrance of the counter-shaft enlargement within the said bores.

3. In a transmission gearing of the character described, the combination of a driving shaft, a driven shaft alined therewith, a longitudinally movable countershaft arranged adjacent and parallel with the said driving and driven shafts, gearing connecting the said driving shaft with the counter-shaft and having a splined connection with the latter shaft to permit of its longitudinal movement, a series of gears mounted on the driven shaft, a second series of gears in constant uniform mesh with the driven shaft gears, and through which latter series of gears the said counter-shaft extends, said counter-shaft having an intermediate polygonal enlargement, and the gears of said second series each having a polygonal bore in which the counter-shaft enlargement is adapted to fit, provided with outwardly flaring end portions having guides for the said shaft enlargement to facilitate its movement into the bore, all substantially as described.

4. In a transmission gearing of the character described, the combination of a driving shaft, a driven shaft alined therewith, a counter-shaft longitudinally movable and arranged parallel with and adjacent to the said driving and driven shafts, gearing connecting the driving shaft and counter-shaft and having a splined connection with the latter whereby to permit of its longitudinal movement, a series of gears loosely revolving in unison on the driven shaft, a second series of gears, through which the counter-shaft extends, in constant uniform mesh with the driven shaft gears, means carried by the counter-shaft engageable with each of the gears through which it passes whereby to lock the same in connection with the counter-shaft, a clutch forming a direct connection between the driving and driven shafts, a second clutch between the driven shaft and its gear series for locking the gears in connection with the shaft, means for simultaneously moving the said clutches, one to clutched and the other to unclutched position and including levers engaging the clutches, one of which levers is provided with an extension, said countershaft having a pair of collars or shoulders for engaging and moving the said lever extension and automatically shifting the position of the clutches in accordance with movements of the counter-shaft, all substantially as described.

BRANTZ MAYER.

Witnesses:
R. W. MATHEWSON,
A. S. FARQUHAR.

Copies of this patent may be obtained for five cents each, by addressing the "Commissioner of Patents, Washington, D. C."